April 15, 1924.
H. J. BARNES
1,490,579
PROCESS OF UNITING METAL PARTS
Filed Jan. 16, 1923
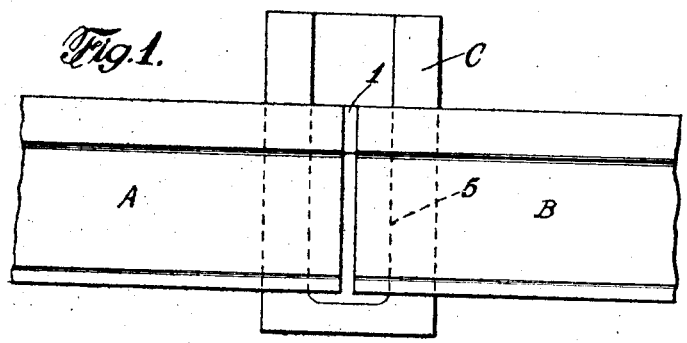
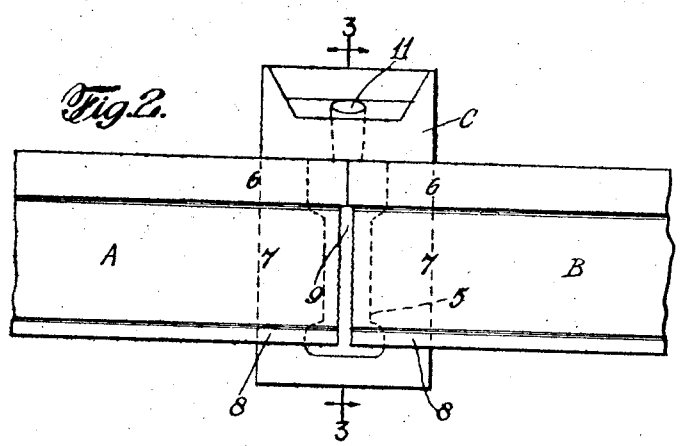
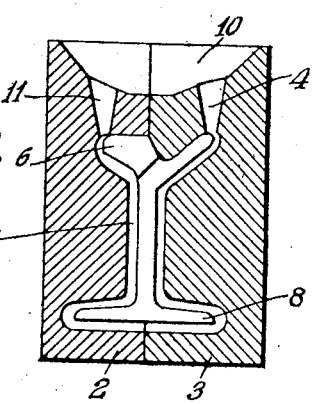
INVENTOR
Henry J. Barnes.
BY HIS ATTORNEYS
Kenyon & Kenyon Patented Apr. 15, 1924.

1,490,579

UNITED STATES PATENT OFFICE.

HENRY J. BARNES, OF ROSELLE, NEW JERSEY, ASSIGNOR TO ALUMINO-THERMIC CORPORATION, A CORPORATION OF NEW JERSEY.

PROCESS OF UNITING METAL PARTS.

Application filed January 16, 1923. Serial No. 612,880.

*To all whom it may concern:*

Be it known that I, HENRY J. BARNES, a citizen of the United States, and a resident of Roselle, county of Union, State of New Jersey, have invented Improvements in Processes of Uniting Metal Parts, of which the following is a specification.

My invention relates to the process of uniting metal parts and particularly to a process where the union of metal parts is produced by welding by means of molten metal.

Heretofore when it has been desired to unite metal parts, particularly rails, it has been customary to provide thin inserts having somewhat the same profile as the faces to be joined, such parts being in the case of rail welding, thin or short sections of rail having the same profile as the rail to be welded, said rail sections being from one quarter to one inch in thickness or length. These inserts were placed between the faces to be joined and the inserts and parts were united by the use of molten metal, particularly the molten metal produced by the alumino-thermic process.

A further development of the process above described consisted in making the insert of lesser area than the faces to be joined. In this case the molten metal would occupy that part of the space between the surfaces to be joined that contained no insert. The molten metal might also run in between the insert and the faces of the parts to be joined that were opposed to the faces of the insert; or the heat of the molten metal or of the accompanying slag or the heat of both might be utilized in raising the insert and the surfaces of the parts to be joined that were opposed thereto to welding temperature so that the insert would be welded to the faces of the parts to be joined that were opposed thereto. This welding of the insert to the parts to be joined might be assisted by the pressure produced between the insert and the parts to be joined by the contraction of the metal between that part of the surfaces to be joined that was not occupied by the insert. A particular example of this development is hereinafter described in connection with rail welding.

An object of my invention is to provide a process whereby metal parts may be so joined by the use of molten metal that there is a practical continuity of at least a portion of said parts, the metal used being preferably the superheated product of the alumino-thermic reaction.

A further object of my invention is the provision of a process of uniting metal parts whereby parts to be joined by the use of molten metal are in one portion butt welded although spaces between other portions of said parts may be filled by the molten metal, preferably alumino-thermic metal; a further object being the utilization of heat in any slag accompanying the molten metal to assist the butt welding.

A further object of my invention is to provide a process of uniting metals whereby continuity of a portion of the parts to be joined may be secured without the use of an insert.

A specific object of my invention is to provide a process of welding rails whereby continuity of the head of the rail and a joining of other portions of the rail by means of added metal will be effected by molten metal, preferably alumino-thermic metal, introduced between those other portions.

Other and further objects of my invention will appear from the following description taken in connection with the accompanying drawings forming part of this specification, in which Fig. 1 illustrates an arrangement with one side of the mold removed, of apparatus for carrying out a welding process heretofore used; Fig. 2 illustrates, with one side of the mold removed, apparatus whereby my invention may be carried out; and Fig. 3 is a cross section taken on the line 3—3 of Fig. 2.

Fig. 1 of the drawings shows an arrangement of apparatus whereby a process heretofore used and above described may be carried out in the welding of rails. A rail having the same profile as the rails to be joined was cut into sections and from each of those sections everything was taken away except that part which constituted a section of the head of the rail. This section of the head of the rail constituted the insert 1. This insert 1 was placed between the ends of the rails A and B and the mold C which ordinarily comprises two parts 2 and 3 as shown in Fig. 3 was placed around the ends of the rail. Now in order to secure a good and efficient welded joint with economy a preheating of the ends of the rails A and B and of the insert 1 as well as the mold could be resorted to. After the preheating molten metal was poured into the mold space, for example through a gate 4 so that it rose around the rail in space 5. It is obvious that considerable difficulty has been experienced in keeping insert 1 in place. This difficulty is exaggerated by the strains due to changes of temperature, etc. There is also considerable expense of labor and material in preparing, fitting and placing the inserts. The object was to secure continuity of the rail-head material, that is, to secure a rail-head having uniform composition. In addition to the objections above pointed out it was necessary to produce two joints in the rail-head for every joint in the rail.

In accordance with my process the rails A and B may be firmly and permanently set into position in any desired manner even including the setting of the rails in concrete. The rails are set so that the ends thereof, particularly the ends of the head 6, are in close relation, such close relation including close contact. The ends of the web 7 and the base flange 8 are then cut away by means of an oxy-acetylene blow torch or other equivalent means to form the space 9 between the opposed ends of the rail. It is obvious that the rails might be so formed in their manufacture and then the removal of parts of the opposed faces would not have to be carried on in the field. A space is thus provided between portions of the opposed faces on the rails A and B or any other parts that are to be joined and portions of the opposed faces of the parts to be joined, for example, the opposed faces of the rail-heads, are in close proximity and perhaps in contact. The ends of the rails or other parts to be joined are then preheated to as high a degree as practice may suggest and a mold C is placed around the ends which may consist of the parts 2 and 3. The mold space 5 around the rail may have a dimension perpendicular to the outer faces of the rail and a dimension in the direction of the length of the rail in accordance with the dictates of practice or there may in some cases be no mold space 5 at all in which case the opposed faces of the mold parts 2 and 3 will have a contour corresponding to the profile of the rail. The preheating may be carried on within the mold. After the preheating, molten metal preferably produced by the alumino-thermic process and preferably in a superheated state and perhaps modified as to its volume and composition by the addition of solid metal parts to the reacting mixture, is introduced into the mold through the pouring gate 4. The removal of parts of the opposed faces, for example the web and base flange 8, forms a space between the opposed faces. The space 9 permits the free entrance of metal between the preheated opposed faces and such a space also facilitates preheating. This metal will become welded on to the spaced portions of the opposed faces and join them together and the opposed faces that are in close relation for example the rail-head faces become welded together. This welding may be accelerated by the pressure created by the contraction of the metal in the space 9 or by the additional application of heat thereto through allowing slag to collect in the basin 10 above the rail-head, or for both reasons. Slag may be brought into contact with the rail head particularly if the rail head has not been preheated to a high degree. Metal is ordinarily contained in both the gate 4 and the riser 11. It is apparent that the expense and trouble of the making and holding in place of an insert have been avoided and there is continuity in the rail-head of metal having the same composition and there is only one joint in the rail head for each joint in the rail. The size of the space 9 between the spaced portions of the faces to be joined for example the length of the space 9 in the direction of the length of the rails is a thing that may be modified to suit each situation but in the case of rails this space may be as small as or even less than three-eighths in the direction of the length of the rail. By varying the dimensions of the mold space 5 as above described the cross-sectional area of the rib thereby produced around the welded joint may be made at each point along that rib proportional to the sectional area of that part of the faces to be joined that is adjacent each point, and the length and thickness or height of the rib may be varied accordingly.

Preheating of the parts to be joined may be carried out either before or after they are enclosed in a mold, and the mold may be preheated; but part or all of the preheating or the use of a mold may be dispensed with in some cases. The removal of a portion of one of the faces to be joined or a portion of each of said faces may be effected either before or after said faces are placed in opposed relation and either before or after the ends of the parts are preheated. When the removal of metal for the purpose of providing a space has been carried out by the use of an oxy-acetylene flame the resulting roughness renders the surface particularly adaptable to welding by means of molten metal, particularly alumino-thermic metal.

While I have described a particular application of my process for the purpose of disclosing the same I do not intend that my invention shall be limited to a process for welding rails or to the details described but that it shall be defined by the hereunto appended claims. My invention is particularly useful in connection with the welding of the rails of an old road. The fish plates or splice plates can be removed and a space formed between the ends of the rails and the ends of the rails can then be welded all in accordance with my invention. Formerly it has been necessary to saw off the end of one of the rails at each joint by hand and then fit in an insert before welding.

What I claim as new and wish to secure by Letters Patent is:

1. The process of joining rails having a head and another part including a web which consists in removing a portion of said other part at the end of one or both of said rails, placing the head portions of said rails in close relation and placing a mold around the ends of the rails and preheating, and introducing alumino-thermic metal, with or without additions, into said mold.

2. The process of joining rails having a head, web and base flange, which consists in removing a portion of the web and base flange at the end of one or both of said rails, placing the ends of the heads of the rails in close relation, and introducing molten metal between the ends of said rails.

3. The process of joining rails having a head, web and base flange, which consists in removing a portion of the web and base flange at the end of one or both of said rails, placing the heads of the rails in close relation, and introducing alumino-thermic metal, with or without the addition thereto of other metal, between the portions of the rail ends spaced by said removal of metal.

4. The process of joining rails having a head, web and base flange, which consists in removing a portion of the web and base flange at the end of one or both of said rails, placing the heads of the rails in close relation, and introducing alumino-thermic metal, with or without the addition thereto of other metal, between the portions of the rail ends spaced by said removal of metal, and utilizing the heat of the slag to assist in welding the rail heads.

5. The process of joining ferrous metal parts which consists in so forming the faces thereof to be joined that when said faces are placed in opposition parts thereof will be in close relation and parts thereof will be in spaced relation, introducing alumino-thermic metal, with or without the addition thereto of other metal, between the spaced portions of said faces and collecting the slag in proximity to but out of contact with the portions of said faces that lie in close relation.

6. The process of joining parts comprising a headed or flanged web which consists in removing a portion of the web of one of said parts from the face thereof to be joined to a face of the other part, placing the heads or flanges of said parts in close relation and introducing molten metal between the faces to be joined.

7. The process of joining ferrous metal parts which consists in placing portions thereof in close relation and other portions in spaced relation, preheating and enclosing in a mold said portions in spaced relation and said portions in close relation, and introducing the molten metal resulting from an alumino-thermic reaction into said space and utilizing the heat of slag to assist in welding said portions in close relation.

8. The process of joining metal parts which consists in placing the faces thereof to be joined in close relation and removing a portion of one or both of said faces by means of an oxy-acetylene flame so as to leave portions of said faces in close relation and other portions thereof in spaced relation, and introducing alumino-thermic metal between said portions in spaced relation.

9. The process of joining ferrous metal parts which consists in melting away portions of the faces to be joined leaving portions of said faces unaltered in shape, placing the faces to be joined in opposition with unaltered portions thereof in close relation and other portions in spaced relation, and introducing alumino-thermic metal between said portions in spaced relation.

10. The process of joining metal rails having a head and another part, which consists in removing a part other than the upper edge of said head from the end face of one or both of said rails placing the end faces of said rails in opposition with the unaltered portions thereof in close relation, placing a mold around said ends of said rails and preheating said ends, and introducing molten metal into the spaces from which metal was removed.

11. The process of joining metal rails having heads and other parts which consists in removing portions of the end faces of one or both of said rails other than the upper edges of the heads thereof, placing said faces in opposition with the unaltered portions thereof in close relation and the altered portions thereof in spaced relation, enclosing said ends of the rails in a mold, introducing alumino-thermic metal into the spaces from which metal was removed, and collecting the slag in proximity to but out of contact with the unaltered upper edges of the heads of the rails.

12. The process of joining ferrous metal parts by use of heat of the alumino-thermic reaction which consists in so shaping the abutting ends of parts to be joined that corresponding parts of each end are out of contact while other parts are in contact, bringing superheated metal produced by an alumino-thermic reaction into direct contact with the separated portions of the parts to be joined and effecting the joining of those portions of the ends which are in contact, by heat furnished from the said alumino-thermic reaction.

In testimony whereof, I have signed my name to this specification.

HENRY J. BARNES.

Witness:
C. B. TRIMMER.